United States Patent Office 2,945,863
Patented July 19, 1960

2,945,863

AMIDES OF AMINOALKYL PYRROLIDONES

Saul R. Buc, Easton, and Earl P. Williams, Pen Argyl, Pa., assignors to General Aniline & Film Corporation, New York, N.Y., a corporation of Delaware No Drawing. Filed June 24, 1958, Ser. No. 744,082

6 Claims. (Cl. 260—326.3)

The present invention relates to new compositions of matter having varied industrial uses and applications and particularly to reaction products of fatty acids with aminoalkyl pyrrolidones.

An object of the present invention is to provide a new and useful class of products obtained by the selected acylation of aminoalkyl pyrrolidones with fatty acids or mixtures of fatty acids.

Further objects and advantages will become manifest from the following description.

The reaction products of aminoalkyl pyrrolidones with a fatty acid or a mixture of fatty acids prepared in accordance with the present invention are characterized by the following general formula:

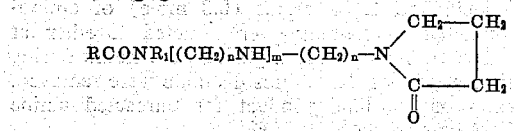

wherein R represents at least one hydrocarbon group containing from 5 to 22 carbon atoms, e.g. amyl, hexyl, nonyl, octyl, decyl, dodecyl, tridecyl, tetradecyl, pentadecyl, heptadecyl, hexadecyl, octadecyl, nondecyl, arachidyl, behenyl, etc., benzyl, methylbenzyl, ethylbenzyl, propylbenzyl, phenethyl, cuminyl, mesityl, menaphthyl, etc., lauryl, myristyl, palmityl, stearyl, oleyl, linoleyl, eleostearyl, linolenyl, tetracosanyl, etc. and mixtures thereof derived from fatty acids, e.g. coconut fatty acid, tallow fatty acid, soya fatty acid, etc., $R_1$ represents either hydrogen, lower alkyl such as methyl, ethyl, propyl, isopropyl, butyl, amyl, isoamyl, etc., or hydroxy alkyl of 1 to 5 carbon atoms, e.g. hydroxy methyl, hydroxy ethyl, hydroxyl propyl, hydroxy isopropyl, hydroxy butyl, hydroxy amyl, etc., $m$ represents either 0, 1, 2 or 3 and $n$ represents 2 or 3.

The reaction products characterized by the foregoing general formula are readily prepared by reacting 1 mole of a fatty acid or a mixture of fatty acids with 1 mole of an aminoalkyl pyrrolidone under conditions as will be described hereinafter. The aminoalkyl pyrrolidone is first prepared by heating in an autoclave a slight molar excess of an alkylene diamine or polyamine with 1 mole of γ-butyrolactone at a temperature of 200° to 250° C. within 3 hours and kept at that temperature for 4 to 7 hours until the gauge pressure of the autoclave remains constant for 2½ hours. The desired aminoalkyl pyrrolidone is then distilled at reduced pressure. As examples of suitable alkylene diamines and polyamines which are reacted with γ-butyrolactone, the following are illustrative:

ethylenediamine
trimethylene diamine
diethylene triamine
triethylene tetramine
tetraethylene pentamine
3,3'-iminobispropylamine
N-(β-hydroxyethyl)-ethylene diamine
N-(methyl) ethylene diamine
N-(ethyl) ethylene diamine
N-(propyl) ethylene diamine
N-(hydroxypropyl) ethylene diamine
N-(methyl) trimethylene diamine
N-(ethyl) trimethylene diamine
N-(hydroxyethyl) trimethylene diamine The following aminoalkyl pyrrolidones were prepared in accordance with the foregoing procedure:

aminoethylaminoethyl pyrrolidone
aminoethyl pyrrolidone
hydroxyethylaminoethyl pyrrolidone
N-(3-amino-2-hydroxypropyl) pyrrolidone
N-(3-aminopropyl) pyrrolidone
β-(2-aminoethylamino)-ethyl pyrrolidone
2-[β-(2'-aminoethylamino) ethylamino]-ethyl pyrrolidone
3-(3'-aminopropylamino)-propylamino pyrrolidone
N-(methylaminoethyl) pyrrolidone
N-(ethylaminoethyl) pyrrolidone
N-(propylaminoethyl) pyrrolidone
N-(hydroxypropylaminoethyl) pyrrolidone
N-(methylaminopropyl) pyrrolidone
N-(ethylaminopropyl) pyrrolidone
N-(hydroxyethylaminopropyl) pyrrolidone 1 mole of any one of the foregoing aminoalkyl pyrrolidones is heated with 1 mole of a fatty acid or a mixture of fatty acids containing from 5 to 22 carbon atoms at a temperature ranging from 110° to 150° C. at a pressure of 25–40 mm. of mercury pressure. The fatty acid or mixtures thereof may be from any source regardless whether it is saturated, unsaturated, or of the aliphatic or aromatic series. Acids which we have found to be particularly reactive with the aminoalkyl pyrrolidones include caproic, capryllic, capric, lauric, myristic, palmitic, stearic, oleic, linoleic, tall oil, hydrogenated tall oil, naphthenic or abietic acid, phenoxyalkylcarboxylic, halogenated phenoxyalkylcarboxylic, alkyl benzoic acids such as dodecylbenzoic, nonylbenzoic, octylbenzoic; acids from oxo alcohols and aldehydes; acids from oxidized petroleum fractions; acid mixtures from various natural plant and animal oils such as olive, tallow, palm, castor, peanut, coconut, soybean, cottonseed, ucuhuba, linseed, fish oils such as cod, herring, menhaden, etc.; neatsfoot, sperm, corn, butter, babassu, kapok, hempseed, mustard, rape, safflower, sesame, etc., dimer acids, trimer acids, etc.

The reaction products thus obtained are particularly useful as rust inhibitors, as thickening agents for greases and the preparation of thixotropic paints, as antistatic agents, anti-oxidants, softening agents, emulsion breakers, collectors in froth flotation processes, as additives to mineral aggregates to improve wetting by asphalt for road building uses, as corrosion inhibitors for iron and steel, for use with pigments as wetting, flushing and grinding aids, for use in textile oil emulsions to aid in coating the textile fiber with oil, for preparing resin dispersions, in dry cleaning, in emulsion polymerization, in fat liquoring of leather, in hair dyeing, in ore flotation, disinfectants, insecticides, nematocides, mothproofing agents, bacteriocides, fungicides, biocides, herbicides, anti-fogging agents, emulsifiers, as additives for fuel oils, hydraulic fluids, lubricating oils, cutting oils, etc. They can be used as wetting, frothing, or washing agents in the treatment and refining of textiles; for fulling, sizing, impregnating and bleaching treatments; for producing foam in fire extinguishers; as a means for improving the absorptive power of fibrous bodies, as additives to the water or brine used for oil recovery from oil bearing strata by flooding techniques, air entraining agents for concrete or cement; for use in bonding agents used in various building materials, as additives to pulp slurries to prevent foaming and also to aid the heating operation in paper making.

In addition to the foregoing, they are particularly useful as catonic substances, i.e. their great activity at surfaces and interfaces, which permit their use in a large field of technical arts. For example, they can be employed as wetting, frothing or washing agents in the treatment and refining of textiles; for converting liquid or solid substances which per se are insoluble in water into creamy emulsions; for carbonizing; for dyeing; for the pasting of dyestuffs; for filling; sizing; impregnating and bleaching treatments; as cleansing agents in hard water, in tanning and mordanting processes; for dyeing acetate with insoluble dyestuffs; for producing foam in fire extinguishers; as a means for improving the absorption power of fibrous bodies, and as an aid in softening baths for hides and skins.

The reaction products are valuable emulsifiers for insecticide compositions and agricultural sprays such as DDT, 2–4–D, Toxaphene, Chlordane. The products are also valuable for use as additives to petroleum products, as additives for fuel oils, hydraulic fluids, lubricating oils, cutting oils, as additives to the water or brine used for oil recovery from oil-bearing strata by flooding techniques.

Other valuable uses are in metal cleaning compositions, dry cleaning compositions, additives for rubber latices, foam inhibitors for synthetic rubber latex emulsions, additives for road building materials, additives to asphalt compositions, plasticizers and modifiers for vinyl plastics and other type plastic materials, for incorporation into adhesives, paint, linoleum, for use in bonding agents used as various insulating and building materials, as refining aids in wood digesters to prepare pulp, as additives to pulp slurries in beating operations to prevent foaming and also to aid the beating operation in paper making.

The products are also useful as emulsifiers for emulsion polymerization, as mercerizing assistants, wetting agents, rewetting agents, dispersing agents, detergents, penetrating agents, softening agents, cutting oils, lime soap dispersants, dishwashing agents, antistatic agents, disinfectants, insecticides, herbicides, mothproofing agents, bacteriocides, fungicides and biocides.

They are valuable as anti-fogging agents for use on glass and other surfaces where the accumulation of an aqueous fog is detrimental. They are useful in the rayon industry as additives to the dope and as aids in clarifying viscose rayon. They are of value in hydraulic fluids.

The products are especially useful in breaking petroleum emulsions. They may be used to break emulsions of crude petroleum and salt water as obtained from oil wells by introducing the agent into the well, or to break or prevent emulsions which would result from the water flooding process for recovering oil from oil-bearing strata. They may also be used to break emulsions encountered in a petroleum refining process.

They are useful as corrosion inhibitors, in the protection of metals especially ferrous metals, in acid pickling baths, in acid cleaning compositions and in electroplating baths.

Other valuable uses are as solvents, as cleaning agents for paint brushes, as additives for paints, lacquers, and varnishes, as greases and stuffing agents.

The products are particularly valuable in the preparation of skin creams, lotions, salves and other cosmetic preparations such as home hairwave sets, shampoos, tooth pastes, etc.

The following examples will show the preparation of the new reaction products and some of their applications.

*Example I*

In a 500 cc. 4-necked flask equipped with a stirrer, thermometer and downward condenser to a receiver equipped for vacuum take-off were placed 100.1 grams (0.5 mole) of lauric acid and 85.5 grams (0.5 mole) of aminoethylaminoethyl pyrrolidone. The mixture was then heated at 126°–142° C./30 mm. over a period of 6 hours during which time a total of 9.5 grams distillate was removed.

Titration of the final product for unreacted amine showed that the conversion was 91% complete.

The tan waxy product is an effective lime soap dispersing agent.

*Example II*

In a manner similar to Example I, 79.1 grams (0.5 mole) of pelargonic acid and 85.5 grams (0.5 mole) of aminoethylaminoethyl pyrrolidone were reacted together at 118°–144° C./30 mm. over a period of 4 hours during which time a total of 11.0 grams distillate were removed.

Titration of the final product for unreacted amine showed that the conversion was 87.1%.

This product is a very effective antistatic agent when tested at 1% on nylon, Orlon, Dacron and Acrilan.

*Example III*

In a similar manner, 141.2 grams (0.5 mole) of oleic acid and 85.5 grams (0.5 mole) of aminoethylaminoethyl pyrrolidone were reacted together at 135°–140° C./30 mm. over a period of 5 hours, during which time a total of 10.0 grams distillate were removed.

Titration of the final product for unreacted amine showed that the conversion was 95.7%.

The amber liquid product is an excellent emulsifying agent for DDT in hydrocarbons.

*Example IV*

In a similar manner, 115.3 grams (0.8 mole) of iso-octanoic acid and 136.8 grams (0.8 mole) of aminoethylaminoethyl pyrrolidone were reacted together at 138°–142° C./30 mm. over a period of 6 hours during which time a total of 14.8 grams distillate were removed.

Titration of the final product for unreacted amine showed the conversion to be 70%.

The final product is an amber liquid which is an effective antistatic agent when tested at 1% on nylon, Orlon, Dacron and Acrilan.

*Example V*

In a similar manner 61.9 grams (0.24 mole) of palmitic acid and 41.4 grams (0.24 mole) of aminoethylaminoethyl pyrrolidone were reacted together at 130°–137° C./30 mm. over a period of 6 hours during which time a total of 4.7 grams distillate were recovered.

This product is an effective foam building agent when formulated with alkylarylsulfonates.

*Example VI*

In a similar manner, 114.4 grams (0.4 mole) of Armour's Neo-Fat 42–06 (a mixture of 50% of oleic acid, 40% of linoleic acid, 4% of linolenic acid and 6% of rosin acids) and 68.4 grams (0.4 mole) of aminoethylaminoethyl pyrrolidone were reacted at 135°–140° C./30 mm. over a period of 6 hours during which time a total of 9.2 grams distillate were removed.

Titration for unreacted amine showed that the conversion was 90%.

The dark viscous liquid product is an effective antistatic agent when tested at 1% on nylon, Orlon, Dacron and Acrilan.

*Example VII*

In a similar manner, 113.6 grams (0.4 mole) of stearic acid and 68.4 grams (0.4 mole) of aminoethylaminoethyl pyrrolidone were reacted at 35°–140° C./30 mm. over a period of 5½ hours during which time a total of 8.0 grams distillate were removed.

Titration for unreacted amine showed that the conversion was 94%.

This tan waxy product is an effective foam building agent when formulated with alkylarylsulfonates.

Example VIII

In a 500 cc. 4-necked flask equipped with a stirrer, thermometer, downward condenser and receiver equipped for vacuum take-off were placed 51.3 grams (0.4 mole) of aminoethyl pyrrolidone and 80.1 grams (0.4 mole) of lauric acid. The contents of the flask were then heated to 140–145° C. at 30 mm. and held at this temperature and pressure for a total of 5½ hours. At the end of this time a total of 6.7 grams of water had distilled over (theory 7.2 or 93%). A sample of the final product was titrated potentiometrically for unreacted amine. 0.00017 equiv./g. amine remained. This corresponds to a conversion of 94.7% of the total amine charged. The final product was then dissolved in 200 ml. of warm isopropyl ether, cooled and filtered. 1% in water forms a clear solution at 33° C. This product is an excellent wetting agent, wetting at 0.35 g./liter (25 sec. conc.) which is 155% that of "Igepal" a commercially available surfactant obtained by reacting 1 mole of phenylphenol with 15–25 moles of ethylene oxide. The product is also an effective antistatic agent when tested on nylon, Orlon and Dacron.

Example IX

In a manner similar to Example VIII, 51.3 grams (0.4 mole) of aminoethyl pyrrolidone were reacted with 112.9 grams (0.4 mole) of oleic acid at 140–144° C./30 mm. over a period of 5 hours.

Titration of the amine consumed showed that the reaction was 93% completed. The final product is an amber liquid which dispersed well in water at 1% and became clear on heating to 60° C. It formed good emulsions with mineral oil and was an effective antistatic agent.

Example X

In a manner similar to Example VIII, 51.3 grams (0.4 mole) of aminoethyl pyrrolidone were reacted with 63.2 grams (0.4 mole) of pelargonic acid at 125–140° C./30 mm. over a period of 3½ hours.

The titration of the amine consumed showed that the reaction was 89.5% completed. 1% of the tan solid in water formed a clear solution and is an effective antistatic agent.

Example XI

In a manner similar to Example VIII, 51.3 grams (0.4 mole) of aminoethyl pyrrolidone were reacted with 84.8 grams (0.4 mole) of DD coconut fatty acids (consisting of a mixture of 8% caprylic, 7% capric, 49% lauric, 17% myristic, 9% palmitic, 2% stearic, 6% oleic and 2% linoleic acid) at 130–135° C./30 mm. over a period of 6½ hours. Titration of the amine consumed showed that the reaction was 95% completed. This product, a light colored solid, is an excellent wetting, foaming agent and antistatic agent.

Example XII 102.5 grams (0.8 mole) of aminoethyl pyrrolidone were reacted with 115.3 grams (0.8 mole) of isooctanoic acid at 105–132° C./30 mm. over a period of 5½ hours.

Titration of the amine consumed showed that the reaction was 81% completed. This product, an amber liquid, did not foam in water and therefore has possibilities for use as a defoaming agent.

Example XIII 51.3 grams (0.4 mole) of aminoethyl pyrrolidone were reacted with 88.0 grams (0.4 mole) of stripped coconut fatty acids (consisting of a mixture of 57% lauric, 21% myristic, 10% palmitic and 2% stearic acid) at 125–133° C./30 mm. over a period of 3 hours.

Titration of the amine consumed showed that the reaction was 94% completed. This product, a light tan solid, is a good wetting and foaming agent as well as a foam builder when formulated with other surfactants. It is also an effective antistatic agent.

Example XIV 51.3 grams (0.4 mole) of aminoethyl pyrrolidone were reacted with 91.2 grams (0.4 mole) of myristic acid at 132–138° C./30 mm. over a period of 3 hours.

Titration of the amine consumed showed that the reaction was 95% completed. This product, a light tan solid, is an excellent foam builder when formulated with other surfactants (equal to Surf) and is also an effective antistatic agent.

Example XV 51.3 grams (0.4 mole) of aminoethyl pyrrolidone were reacted with 103.2 grams (0.4 mole) of palmitic acid at 135–141° C./30 mm. over a period of 3½ hours.

Titration of the amine consumed showed that the reaction was 99% completed. This product, a light tan solid, is an excellent foam builder when formulated with other surfactants (equal to Surf) and is also an effective antistatic agent.

Example XVI 51.3 grams (0.4 mole) of aminoethyl pyrrolidone were reacted with 68.8 grams (0.4 mole) of capric acid at 130–135° C./30 mm. over a period of 3 hours.

Titration of the amine consumed showed that the reaction was 93% completed.

The final product, a light colored solid, is soluble at 1% in water and has a wetting strength of 0.75 grams/liter (25 sec. conc.) which is equal to 73% that of "Igepal" (see Example VIII). It is also a good foaming agent and antistatic agent.

Example XVII 51.3 grams (0.4 mole) of aminoethyl pyrrolidone were reacted with 114.4 grams (0.4 mole) of Armour Neo-Fat 42-06 (consisting of a mixture of 50% oleic acid, 40% linoleic acid, 4% linolenic acid and 6% rosin acid) at 134–141° C./30 mm. over a period of 3½ hours.

Titration of the amine consumed showed that the reaction was 90% completed.

This product, a dark colored liquid, is a good foam builder when formulated with other surfactants.

Example XVIII 63.2 grams (0.4 mole) of N-(3-amino-2-hydroxypropyl) pyrrolidone were reacted with 80.1 grams (0.4 mole) of lauric acid at 140° C./30 mm. over a period of 3½ hours.

This product, a light tan solid, is a good foam builder when formulated with other surfactants.

Example XIX 63.2 grams (0.4 mole) of N-(3-amino-2-hydroxypropyl) pyrrolidone were reacted with 112.9 grams (0.4 mole) of oleic acid at 140° C./30 mm. over a period of 3½ hours.

This product, a tan paste, is an excellent foaming agent and is soluble in kerosene.

Example XX 59.0 grams (0.3 mole) of hydroxyethylaminoethyl pyrrolidone of the formula

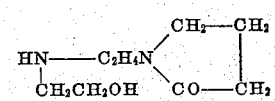

were reacted with 60.0 grams (0.3 mole) of lauric acid at 140–145° C./30 mm. over a period of 3½ hours.

The final product, a dark paste, foamed well and is an effective antistatic agent.

Example XXI 64.1 grams (0.5 mole) of aminoethyl pyrrolidone were reacted with 110.5 grams (0.5 mole) of 2,4-dichlorophenoxybutyric acid at 127–157° C./30 mm. over a period of 3½ hours. The product, which was recrystallized from xylene, is a very effective herbicide.

We claim:

1. Amides of aminoalkyl pyrrolidones having the following general formula:

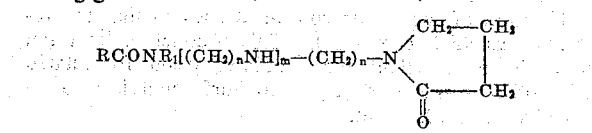

wherein R represents at least one hydrocarbon group containing from 5 to 22 carbon atoms, $R_1$ represents a member selected from the class consisting of hydrogen, lower alkyl and hydroxyalkyl of 1 to 5 carbon atoms, $m$ represents a numeral ranging from 0 and 1 to 3 and $n$ represents a positive integer of 2 to 3.

2. An amide of an aminoalkyl pyrrolidone of the following formula:

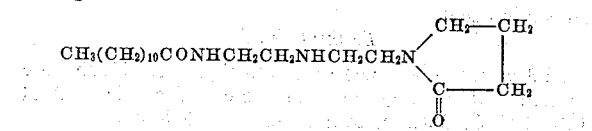

3. An amide of an aminoalkyl pyrrolidone of the following formula:

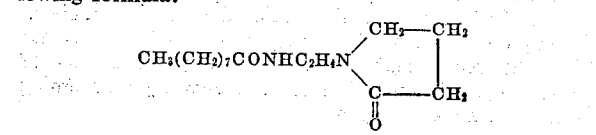

4. An amide of an aminoalkyl pyrrolidone of the following formula:

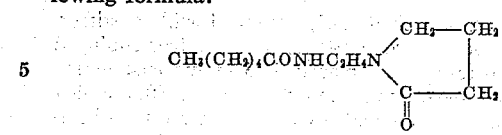

5. An amide of an aminoalkyl pyrrolidone of the following formula:

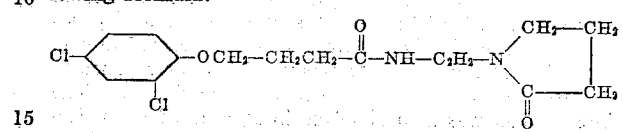

6. An amide of an aminoalkyl pyrrolidone of the following formula:

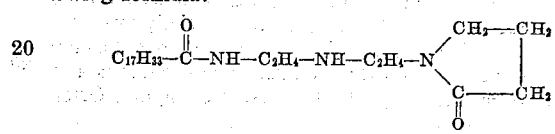

References Cited in the file of this patent

UNITED STATES PATENTS

| | | |
|---|---|---|
| 2,742,464 | Koebner et al. | Apr. 17, 1956 |
| 2,805,135 | Bell et al. | Sept. 3, 1957 |

FOREIGN PATENTS

| | | |
|---|---|---|
| 730,182 | Germany | Dec. 12, 1942 |